Figure 1:
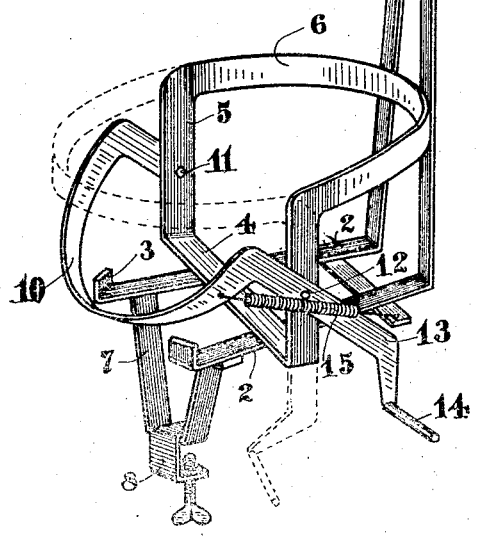

Sept. 14, 1926.
C. KIVI
1,600,181

ARTICLE CARRIER

Filed April 2, 1925

Inventor
Carl Kivi

By Raymond Jones.
Attorney

Patented Sept. 14, 1926.

1,600,181

UNITED STATES PATENT OFFICE.

CARL KIVI, OF BELDEN, NORTH DAKOTA.

ARTICLE CARRIER.

Application filed April 2, 1925. Serial No. 20,110.

This invention relates to vehicle article carriers and more specifically to carriers particularly adapted for carrying cylindrical articles such as milk cans, but it is contemplated that the device be susceptible of modification in its broadest aspect so as to adapt the same for carrying articles of various sizes and shapes.

An object of this invention is to provide a carrier of the character described capable of being rigidly supported upon a vehicle such as an automobile.

Another object of this invention is to provide an article carrier having means to rigidly hold and support an article in a clamping manner.

Another object of this invention is to provide an article carrier that is relatively light, simple in construction and operation, and one that can be economically manufactured.

Other objects will appear from the detailed description which follows.

In the drawings—

Figure 2:
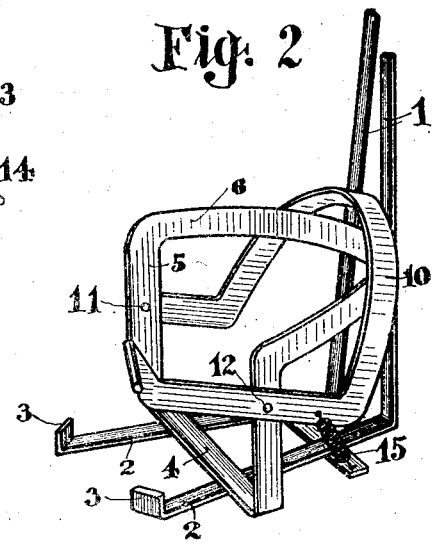

Figure 1 is an isometric projection of the device showing the clamp in fully open position; and Fig. 2 is a similar view showing the clamp in fully closed position.

Referring to the drawings in detail, numeral 1 indicates a V-shaped vertical member, each lower portion 2 of which is shown bent at right angles to the vertical portion and terminates in a short vertical extension or hook 3. The article carried is supported upon portions 2 and is prevented from any sliding motion by extensions 3. Cross member 4 is rigidly attached to portions 2 and each end thereof is bent upwardly to form side members 5. A semi-circular member 6 is rigidly attached at each end to corresponding ends of members 5 and at its central portion to vertical member 1.

In order to support the carrier upon a running board, I have provided a downwardly extending V-shaped brace member 7, to the lower central portion of which is attached a screw clamping means 8 which is adapted to rigidly engage a running board. The upper end of vertical member 1 terminates in a hook member 9 which is adapted to engage over a horizontal side edge of a vehicle. A semi-circular clamping member 10 is provided pivotally attached at 11 and 12 to side members 5. One end of clamp 10 is extended as at 13 to form an operating lever and handle 14. Pivots 11 and 12 each engage downwardly turned end portions of clamp 10. A spring 15 is attached at one end to extension 13 at a suitable point above pivot 12 and at its other end to an extension 16 shown attached to one of portions 2 and extending laterally therefrom. It will be noted that the spring end supports are so located with reference to pivot 12 that the upper or left hand end of said spring falls below a line connecting the pivot and the other end of said spring when said clamp is fully opened whereby said spring acts to retain said clamp at its open position.

In using the carrier described, the same is attached to the side of a vehicle and running board by means of the hook 9 and clamp 8 respectively. The clamp member 10 is then moved to an open or forward position by means of its handle 14, said clamp remaining in the open position because of the relative locations of spring 15 and pivot 12. The cylindrical container or other article to be transported is placed in position on members 2 so as to be engaged by hooks 3 and rear semi-circular member 6. Clamp 10 is then released so as to be moved towards member 6 until the same comes into contact with the container in which position the spring 15 yieldingly but firmly forces clamp 10 against the container whereby the same is prevented from moving an appreciable amount from its original position.

While I have shown my improved article carrier of such shape and dimensions to support cylindrical containers or articles, it is contemplated that in its broadest aspect the carrier can be so modified as to accommodate articles of other shapes as will be included within the scope of the following claims.

I claim:—

1. An article carrier comprising an inverted V-shaped vertically extending member, the lower portions of said member being bent into a horizontal plane to form an article support, a transverse member connected to said bent portions and terminating in vertical upturned end portions said vertical portions being extended to form an article engaging member, and a clamp member pivotally connected at opposite ends to said upturned end portions, one end of said clamp member being extended to provide an offset handle portion.

2. An article carrier comprising an inverted V-shaped vertically extending member, the lower portions of said member being bent into a horizontal plane to form an article support, a transverse member connected to said bent portions and terminating in vertical upturned end portions, a clamp member pivotally connected at opposite ends to said upturned end portions, said end portions being extended rearwardly and connected to form an article engaging member.

3. An article carrier comprising an inverted V-shaped vertically extending member, a hook portion at the upper end of said member, the lower ends of said member being bent into a horizontal plane to form a support, a transverse member connecting said bent portions, a clamp member pivotally mounted on said transverse member, brace supporting means extending downwardly from the bent lower ends of said V-shaped member and connected at their lower ends, and a clamp on the lower end of said brace means.

4. An article carrier comprising an inverted V-shaped vertically extending member, the lower portions of said member being bent into a horizontal plane to form a support, a semi-circular member connected adjacent its central portion to said vertical member and a semi-circular clamp pivotally associated with said semi-circular member, and tension means operatively associated with said clamp.

In testimony whereof I affix my signature.

CARL KIVI.